UNITED STATES PATENT OFFICE.

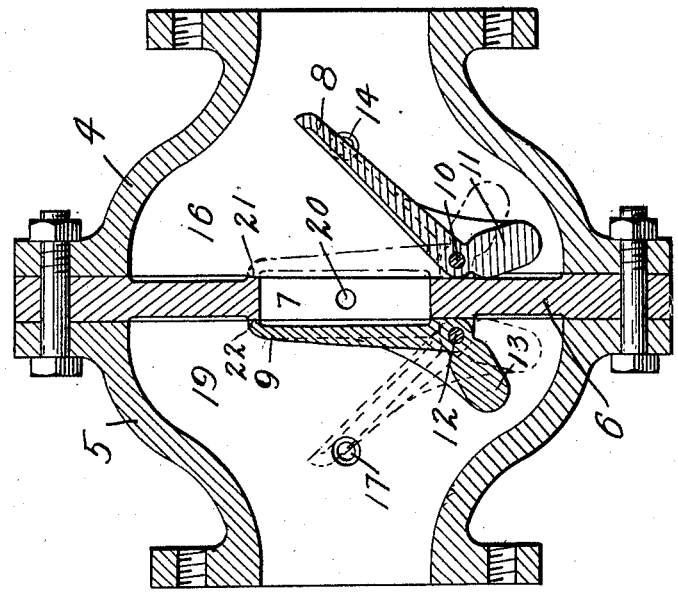
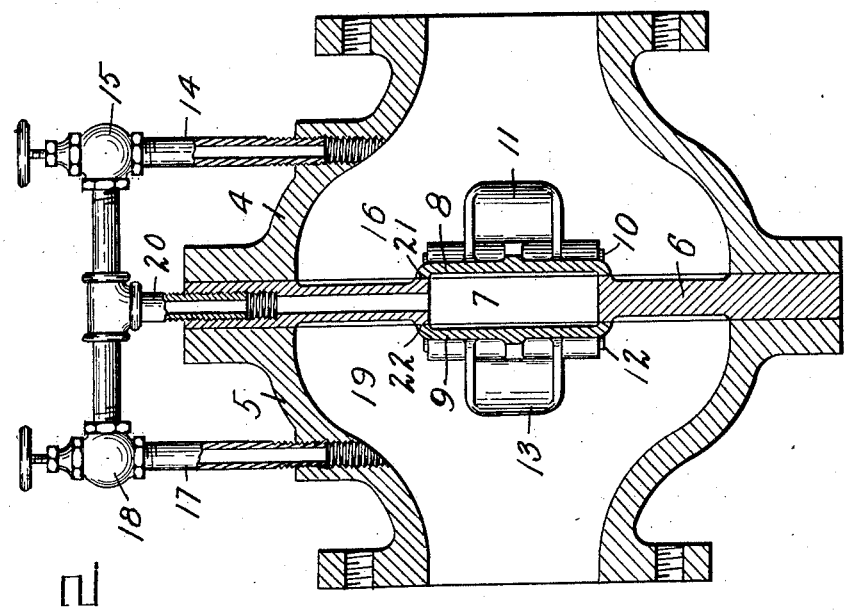

CLAUS D. MYER, OF WEST HOBOKEN, NEW JERSEY.

EMERGENCY-VALVE.

1,394,332.　　　　　Specification of Letters Patent.　　Patented Oct. 18, 1921.

Application filed July 12, 1919, Serial No. 310,475. Renewed May 12, 1921. Serial No. 468,976.

*To all whom it may concern:*

Be it known that I, CLAUS D. MYER, a citizen of the United States, residing at West Hoboken, in the county of Hudson and State of New Jersey, have invented a new and useful Emergency-Valve, of which the following is a specification.

This invention relates to valves used with gases or liquids; and the object of the invention is to provide an emergency valve that will close automatically should a break occur from any cause on either side of the same; a further object being to provide a valve of this kind that is easy to operate, and which is certain of operation at any time after being closed.

The invention is illustrated in the accompanying drawing, in which—

Figure 1, is a sectional elevation of an emergency valve constructed in accordance with my invention, the position of the operative parts being indicated with dotted lines; and Fig. 2, is a sectional view, taken at right angles to Fig. 1.

In the drawing like numerals of reference refer to the same parts in each of the views.

In the practice of my invention I provide a valve casing preferably composed of two parts 4 and 5, so that the part 6 carrying my improved valve construction can go between the same and form a part of the complete casing, as clearly shown.

The part 6 is provided with a central orifice 7, which forms a chamber when the valves 8 and 9 are in a closed position. The valve 8 is pivotally mounted at 10, and carries a counterweight 11 so proportioned that it will hold the valve open when the valve is in normal operation. The valve 9 is pivotally mounted at 12, and carries the counterweight 13 which is proportioned so it will hold the valve 9 open when the valve is in normal operation.

I also provide a pipe 14, controlled with a valve 15, and in communication with the chamber 16 in which the valve 8 is mounted; and a pipe 17, controlled with a valve 18 is in communication with the chamber 19 in which the valve 9 is mounted. I also provide a pipe 20 which is always in communication with the chamber 7.

The operation is as follows. When air, or a liquid, or gas is turned on under pressure on either side of the valve the small valves 15 and 18 are opened so that the pressure may be equalized on each side of the pivotally mounted valves 8 and 9, at which time the pressure in the chamber 7 will also be equalized by reason of the pipe 20 communicating with the same. Should a break occur on either side of the valve, the sudden increase of pressure on the opposite side will cause the part 8, or 9 to close against the normal action of the corresponding counterweight, and there will be no further loss of fluid except that which will pass through the small pipes 14 and 17; and when the valves 15 and 18 are closed this loss will be shut off, as will be clear. When the line is repaired, and it is desired to resume operation, the valves 15 and 18 are again opened, when the pressure will be equalized on all sides and within the chamber 7, and the respective counterweight will then act to permit the passage of the fluid.

It will thus be seen that I have provided an emergency valve that is simple in construction and positive in operation. It will also be seen that I have provided means for equalizing pressure on each side of the operative parts no difference in which direction the fluid is flowing; and have also provided means to prevent the contact of the operative parts while providing for the ready operation of the same. By making the two pivotal valves as shown, the valve 8 can have the valve seat 21 without interfering with the valve seat 22 of the valve 9.

I claim:

1. An emergency valve having two pivotal parts forming a chamber between them, a valve-controlled passageway around said parts, and means to regulate the pressure in said chamber whereby the pressure may be equalized on the two sides of each of said parts, for the purpose set forth.

2. An emergency valve having two pivotal parts having a chamber between them each controlled with a counterweight, and a valve-controlled passageway around said parts, and in communication with said chamber, for the purpose set forth.

3. An emergency valve comprising a casing, a diaphragm carried by said casing and forming a part thereof, a double valve carried by said diaphragm, and a valve-controlled passageway in communication with said casing on each side of said diaphragm.

4. An emergency valve comprising a casing, a diaphragm carried by said casing and forming a part thereof, a double valve seat on said diaphragm, pivotally mounted valves in communication with said seats whereby a chamber is formed between the valves, and means to equalize the pressure on the two sides of said diaphragm and in said chamber.

5. An emergency valve comprising a casing, a diaphragm carried by said casing and forming a part thereof, said diaphragm having a central opening and a valve seat surrounding the same on each side, valves adapted to engage the respective valve seats and open into the opposite sides of the casing chamber, each of said valves being controlled with a counterweight, and a valve-controlled passageway in communication with said casing on each side of said diaphragm, and with the space between said valve seats, for the purpose set forth.

Dated July 7th, 1919.

CLAUS D. MYER.